(12) United States Patent
Joshi et al.

(10) Patent No.: US 8,391,218 B1
(45) Date of Patent: Mar. 5, 2013

(54) MULTIPLE ROUTABLE IP ADDRESSES FOR A CELLULAR ROUTER

(75) Inventors: Kiritkumar Joshi, Cupertino, CA (US); Chandrodaya Prasad, Santa Clara, CA (US); Virendra Malaviya, Cupertino, CA (US); Sachin Gorde, San Jose, CA (US); Vikas Butaney, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 915 days.

(21) Appl. No.: 12/196,421

(22) Filed: Aug. 22, 2008

(51) Int. Cl.
*H04Q 7/36* (2006.01)
(52) U.S. Cl. ........................................ 370/329
(58) Field of Classification Search ........... 370/329–330
See application file for complete search history.

(56) References Cited

U.S. PATENT DOCUMENTS

| | | | |
|---|---|---|---|
| 6,009,103 A | 12/1999 | Woundy | |
| 6,952,735 B1 * | 10/2005 | Aune | 709/228 |
| 6,993,583 B2 | 1/2006 | Anderson et al. | |
| 7,197,549 B1 * | 3/2007 | Salama et al. | 709/223 |
| 2004/0249906 A1 * | 12/2004 | Olbricht et al. | 709/220 |
| 2005/0122946 A1 * | 6/2005 | Won | 370/338 |
| 2006/0161661 A1 * | 7/2006 | Johnson et al. | 709/226 |
| 2008/0300059 A1 * | 12/2008 | Adiraju et al. | 463/42 |

* cited by examiner

*Primary Examiner* — Sulaiman Nooristany
(74) *Attorney, Agent, or Firm* — Brinks Hofer Gilson & Lione (57) ABSTRACT

A system for negotiating routable Internet Protocol (IP) addresses is provided. The system includes a communication device that is operable to transmit a request for a routable Internet Protocol (IP) address, and a cellular router in communication with the communication device. The routable IP address may be used to provide communication to the communication device. The cellular router is operable to receive the request for the routable IP address and negotiate an IP subnet. The IP subnet includes a plurality of routable IP addresses, which are allocated to the cellular router. The cellular router is operable to provide at least one of the plurality of routable IP addresses to the communication device.

16 Claims, 11 Drawing Sheets

IPCP Packet Structure

| Field | CODE | IDENTIFIER | LENGTH | DATA |
|---|---|---|---|---|
| Size | 1 byte | 1 byte | 2 bytes | variable |

FIGURE 5A

IPCP Configuration Option

| 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|
| Option | | | | | | | | Length | | | | | | | |
| Data | | | | | | | | | | | | | | | |

FIGURE 5B

| Option | Length | Description | References |
|---|---|---|---|
| 3 | 6 | IP-Address | RFC 1332 |
| 5 | 10 | IP-Subnet | |

FIGURE 5C

Protocol Configuration Options

| 08 | 07 | 06 | 05 | 04 | 03 | 02 | 01 |
|----|----|----|----|----|----|----|----|
| Protocol Configuration Options IEI ||||||||
| Protocol ID 1 ||||||||
| Length of Protocol ID 1 Contents ||||||||
| Protocol ID 1 Contents ||||||||
| ... ||||||||
| Container ID 1 ||||||||
| Length of Container ID 1 Contents ||||||||
| Container ID 1 Contents ||||||||
| ... ||||||||
| Container ID IP Subnet ||||||||
| Length of Container ID IP Subnet Contents ||||||||
| Container ID contents (IP Subnet and Associated Mask) ||||||||

FIGURE 6A

Information Elements (IE) in the PCO Field

Radio to SPN Direction:

| 0001H | P-CSCF Address Request |
|-------|------------------------|
| 0002H | IM CN Subsystem Signaling Flag |
| ... | ... |
| 0007H | Requested IP Subnet and Associated Mask |

SPN to Radio Direction:

| 0001H | P-CSCF Address |
|-------|----------------|
| 0002H | IM CN Subsystem Signaling Flag |
| ... | ... |
| 0007H | Allocated IP Subnet and Mask |

MULTIPLE ROUTABLE IP ADDRESSES FOR A CELLULAR ROUTER

BACKGROUND

I. Field

The present embodiments relate to negotiating an IP subnet. The IP subnet includes multiple routable Internet Protocol (IP) addresses allocated to a cellular router.

II. Background of Technology

A cellular router assigns publicly routable IP addresses to any IP based host devices (or communication devices) connected to the LAN behind the cellular router, such as digital signage devices or desktops or servers. These devices use the assigned IP addresses to communicate with a central site. The central site is unable to directly communicate with these devices without the publicly routable IP addresses.

DETAILED DESCRIPTION

The present embodiments relate to negotiating an IP subnet. An IP subnet is a pool of IP addresses, such as IP addresses for a network, IP addresses for a broadcast, and/or IP addresses for one or more communication devices. A communication device may request an IP address from a cellular router. The cellular router may receive the IP address request and dynamically request an IP subnet based on the network of communication devices connected to or communicating with the cellular router. The cellular router may request the IP subnet from a network service provider, which may allocate the IP addresses in the IP subnet to the cellular router. The cellular router may distribute the IP addresses to the communication devices.

An Internet Protocol (IP) address is a unique address that communication devices use in order to identify and communicate with other devices on a computer network utilizing the IP standard, such as the Internet. On the public Internet, publicly routable IP addresses are managed and created by the Internet Assigned Numbers Authority (IANA). The IANA generally allocates super-blocks to Regional Internet Registries, which manage gateways. The gateways are responsible for allocating IP addresses to Internet service providers and enterprises.

In one aspect, logic encoded in one or more tangible media for execution is provided. Logic encoded in one or more tangible media for execution is defined as the instructions that are executable by the processor and that are provided on the computer-readable storage media, memories, or a combination thereof. When executed the logic is operable to receive an IP address request from a communication device, negotiate an IP subnet that includes a plurality of routable IP addresses using a radio signal, and assign one of the plurality of routable IP addresses to the communication device, such that communication sent to the allocated IP address is provided to the communication device.

In a second aspect, a method is provided. The method includes receiving a request for an IP address from a first communication device; requesting an IP subnet from a network service provider, the IP subnet including a first IP address and a second IP address; and receiving the IP subnet.

In a third aspect, a system is provided. The system includes a communication device that is operable to transmit a request for a routable Internet Protocol (IP) address, and a cellular router in communication with the communication device. The routable IP address may be used to provide communication to the communication device. The cellular router is operable to receive the request for the routable IP address and negotiate an IP subnet. The IP subnet includes a plurality of routable IP addresses, which are allocated to the cellular router. The cellular router is operable to provide at least one of the plurality of routable IP addresses to the communication device.

In one example, a first digital signage device (DSD) is placed at the entrance of an auditorium to display a digital message to participants entering the convention center (e.g., "No food or drink in auditorium" or "Go Jayhawks"). A second DSD is placed at the exit of the convention center to display digital messages to participants exiting the convention center (e.g., "Please pay for parking before returning to car" or "Another Win!"). A Web server may be used to change the digital messages. For example, the first DSD may be connected to the Internet and assigned a first IP address. The Web server may push data to the first IP address, which may change the digital display (e.g., "Auditorium is full."). The first DSD receives the first IP address from a cellular router. Instead of negotiating only the first IP address, the cellular router negotiates an IP subnet, which includes the first IP address and a second IP address. The second IP address may be assigned to the second DSD, even though the second DSD has not requested the second IP address at the time the IP subnet was negotiated.

One benefit of negotiating an IP subnet is that the cellular router may negotiate with the network service provider fewer times than if individual IP addresses are requested. The cellular router may negotiate once for all of the communication devices connected to or communicating with the cellular router. In the example above, the cellular router may negotiate once with the network service provider and receive IP addresses for both the first and second DSDs.

Another benefit is that the wait time for an IP address may be reduced. For example, after the cellular router receives an IP subnet, communication devices requesting an IP address may be served an IP address without waiting for the cellular router to negotiate with the network service provider.

Figure 1:
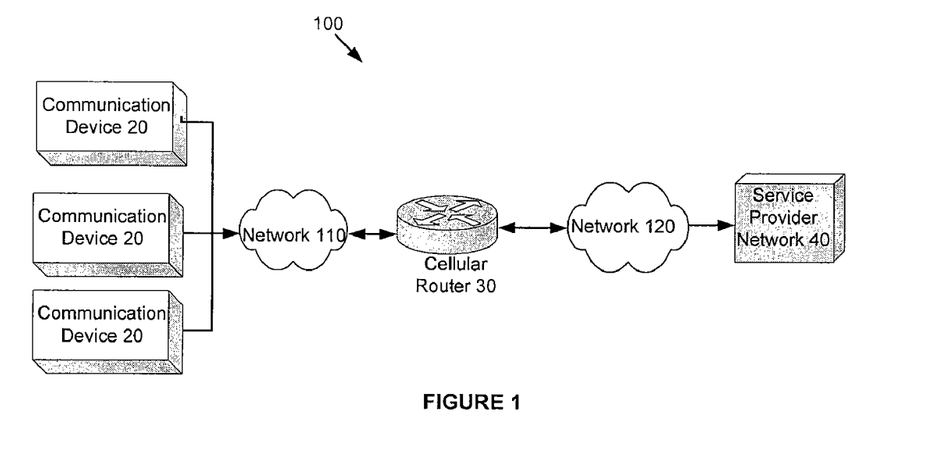
FIG. 1 illustrates one embodiment of a cellular system.

Referring to FIG. 1, the system 100 includes a communication device 20, a cellular router 30, and a service provider network 40. Additional, different, or fewer devices may be provided. For example, the system 100 may include multiple communication devices, cellular routers, service provider networks, or any combination thereof. In another example, an Internet server is provided. The Internet server is operable to push data to an IP address.

Figure 2:
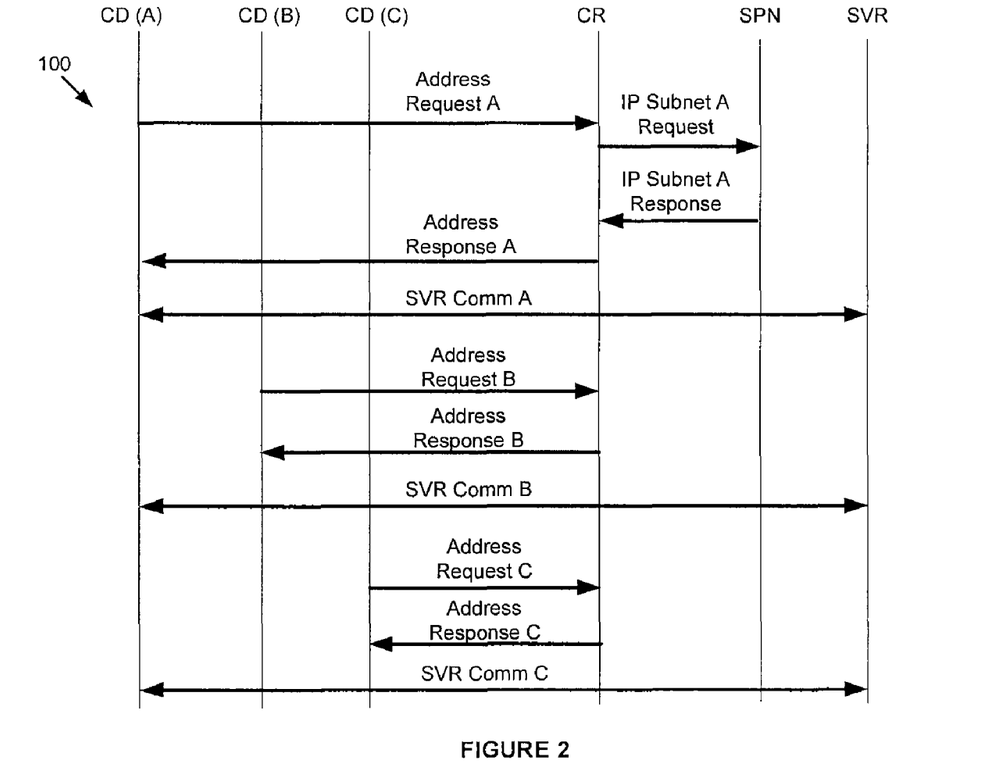
FIG. 2 illustrates one embodiment of a communication flow of a cellular system.

The system 100 is a network, chain, organization, structure, workstation, or other system for negotiating an IP subnet. Negotiating an IP subnet may include requesting, obtaining, assigning, and/or distributing one or more IP addresses. For example, as shown in FIG. 2, the system 100 may include a cellular router (CR) that automatically requests an IP subnet from the service provider network (SPN). The service provider network allocates and returns the IP subnet to the cellular router (IP Subnet A Response). Once the IP subnet is obtained, the cellular router distributes the publicly routable IP addresses in the IP subnet to communication device A, communication device B, and/or communication device C. The IP addresses may be distributed upon request, as a rule, or at any other suitable time. Once a communication device receives a publicly routable IP address, a server (SVR) may begin communicating with the communication device using the IP address.

Figure 3:
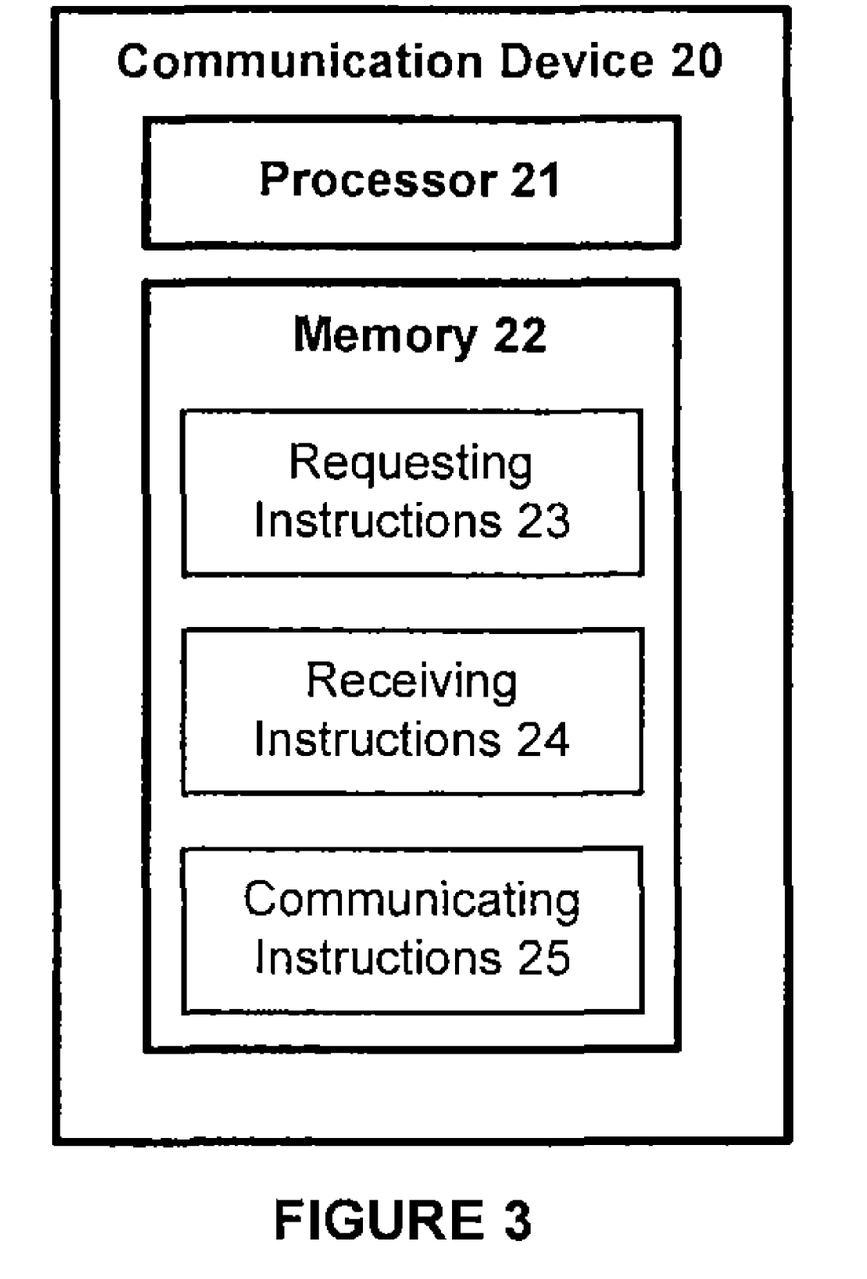
FIG. 3 illustrates one embodiment of a communication device.

FIG. 3 illustrates a communication device 20. The communication device 20 may include a processor 21 and memory 22. Additional, different, or fewer components may be provided. For example, the communication device 20 may include a display device. The display device may be used to display information, such as real-time, multimedia content or other information pushed from an IP server or other communication device.

The communication device 20 is a network-aware device, a global system for mobile (GSM) communications phone, an end host, a client, a mobile device, a technology device (e.g., third generation (3G) or fourth generation (4G) technology device), a digital media player, a digital signage device, a personal computer, a personal digital assistant (PDA), a cellular phone operating on LAN technology, a kiosk, any combination thereof, or any now known or later developed communication device that is operable to communicate using an IP address. For example, the communication device 20 is a 3G mobile device with a 3G cellular wide area network (WAN) interface. The 3G mobile device is connected behind the cellular router 30, but communicates directly with a central site (e.g., base station) once the cellular router distributes an IP address to the 3G mobile device. In the example above, the first and second digital signage devices are communication devices 20.

The processor 21 may request an IP address from the cellular router 30. Requesting may include transmitting a request message to the cellular router 30 using the network 110. The IP address may be a publicly routable IP address used for communication. For example, other communication devices, routers, or servers may push data to the IP address. As shown in FIG. 2, the communication device A requests an IP address (Address Request A) from the cellular router.

The processor 21 may request an IP address at any time after the communication device 20 is booted up. For example, an IP address may be requested immediately after the communication device 20 is powered on. In another example, an IP address may be requested at the expiration of a previous IP address. In another example, an IP address may be requested as a rule, such as "if connection is lost, then request an IP address," or in response to a user selection.

The processor 21 may receive an IP address from the cellular router 30. The received IP address is used to communicate with an IP communication device, such as a Web server. In the example of FIG. 2, the communication device (CD) A receives IP Address AA in the Address Response A from the cellular router. The server (SVR) begins pushing data (SVR Comm A) across an IP network to IP Address AA, which is assigned to communication device A.

The processor 21 may transmit and receive communication using the network 110. The network 110 interconnects the communication device 20 and the cellular router 30. The network 110 may be used for wireless or wired communication. The network 110 may support the processor 21 or cellular router 30 communicating information using any now known or later developed protocol.

In one embodiment, the processor 21 transmits the IP address request to the cellular router 30 using the Dynamic Host Configuration Protocol (DHCP). The DHCP is a protocol used by networked devices, such as the communication device 20, to obtain the parameters for operation in an IP network. One benefit of using the DHCP is that communication devices 20 may be registered or added to the system 100 with little or no manual configurations.

The DHCP may be used to allocate IP addresses. Allocation may include dynamic allocation, automatic allocation, or manual allocation. Dynamic allocation may include providing a lease on an IP address for a period of time to the communication device 20. For example, IP Address AA may be leased to communication device A. An IP address lease is a length of time for which the allocation is valid. The lease may range from hours (e.g., a wireless network at an airport) to months (e.g., for desktops in a wired lab). At any time before the lease expires, the communication device 20 may request renewal of the lease on the current IP address. The communication device 20 may use renewal to maintain the same IP address throughout its connection to the system 100, otherwise it may risk losing its lease while still connected, thus disrupting network connectivity while it renegotiates with the cellular router 20 for its original IP address or a new IP address.

The memory 22 may be computer readable storage media. The memory 22 may include data representing instructions. For example, as shown in FIG. 3, the memory 22 may include requesting instructions 23, receiving instructions 24, and communicating instructions 25. The requesting instructions 23 are executable to request an IP address from a cellular router. The receiving instructions 24 are executable to receive data (e.g., a publicly routable IP address or IP data) from a cellular router or server. The communicating instructions 25 are executable to communicate with other communication devices, routers, or servers. Communicating may include transmitting data, such as an IP address request, or receiving information pushed to an IP address allocated to the communication device 20.

Figure 4A:
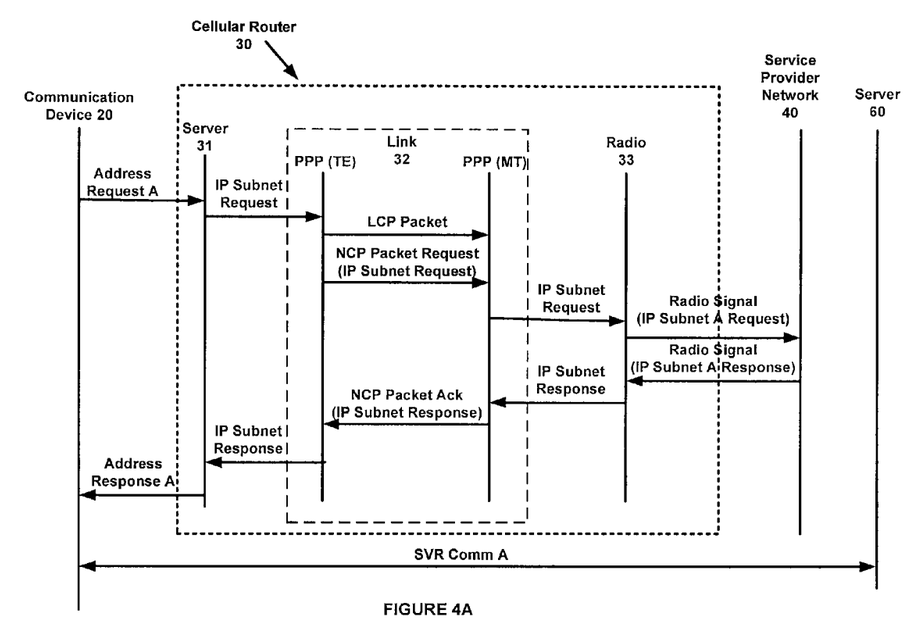
FIG. 4A, 4B illustrate embodiments of a cellular router.

FIG. 4 shows a cellular router 30. The cellular router 30 may include a server 31, point-to-point protocol (PPP) link 32, and a radio 33. Additional, different, or fewer components may be provided. For example, the server 31 may be disposed between the cellular router 30 and a communication device 20.

The cellular router 30 is a 3G router, 4G router, mobile broadband router, network oriented device, industrial unit, mobile router, central router, a router incorporating a cellular data modem for providing shared Internet access, any combination thereof, or any now known or later developed router that is operable to negotiate an IP subnet. For example, the cellular router 30 is a 3G router that is operable to negotiate an IP subnet between the communication device 20 and the service provider network 40. The 3G router may dynamically define an IP subnet request and automatically request the IP subnet using an over-the-air signaling mechanism. The 3G router may automatically add signaling messages to over-the-air signals transmitted to the service provider network 40. In another example, the cellular router 30 is an assignment router that is operable to assign an IP address in an IP subnet to a communication device 30.

The server 31 is operable to listen to a network (e.g., network 110) and make determinations about the size of an IP subnet. Listening to a network may include monitoring and receiving communication from the communication device 20. For example, the server 31 may be a DHCP server that determines the size of an IP subnet based on the number of communication devices 20 using (or registered to use) the network and/or the length of a lease for previously assigned IP address. In another example, the server 31 is an intelligent device that dynamically customizes an IP subnet request.

The server 31 may monitor one, some, or all of communication devices 20. Monitoring may include determining the number of communication devices 20 connected to the cellular router 30, the number of communication devices 20 communicating with the cellular router 30, the number of IP addresses assigned to the communication devices 20, the length of leases for the IP addresses, and other information used to determine the size of an IP subnet.

The server 31 may dynamically determine the size of an IP subnet. The size of the IP subnet is the number of IP addresses in the IP subnet. The size of the IP subnet may be based on the needs of the cellular router 30. For example, the size of the IP subnet may be based on the number of communication devices 20 connected to the cellular router 30, the number of communication devices 20 communicating with the cellular router 30, the number of IP addresses assigned to the communication devices 20, the length of leases for the IP addresses, and other information used to determine the size of an IP subnet. In the example of FIG. 2, communication devices A, B, and C are registered to communicate with the cellular router. Accordingly, the cellular router may need four IP address. IP addresses may be assigned to communication device A, B, and C. The fourth IP address may be stored for future distribution to a communication device, such as communication device A, B, or C loses connection and request another IP address or an additional communication device is added to the system 100.

One benefit of dynamically determining the required number of IP addresses is that the cellular router 30 may customize and/or scale the IP subnet request. For example, only the required number of IP address may be purchased. The number of IP addresses purchased may be scaled to the needs of the cellular router 30.

The server 31 may initiate requesting an IP subnet from the service network provider 40. Initiating an IP subnet request may include transmitting an IP subnet request to the PPP link 32. In the example of FIG. 4, the server 31 transmits IP subnet request A to the link 32. The IP subnet request A may include (define) the size of the IP subnet being requested, for example, four (4) IP addresses.

The link 32 is a link that interconnects the server 31 and the radio 32. The link 32 may relay information between the server 31 and the radio 32. As shown in FIG. 4, the link 32 may be a PPP link using PPP terminal equipment (TE) and PPP mobile termination (MT).

The PPP (TE) and PPP (MT) may negotiate a PPP link. Negotiating a PPP link may include transmitting PPP packets, configuring the link, agreeing on the parameters for how data should be passed, and establishing a PPP link. Configuring the link may include setting up and maintaining a PPP link. To configure the PPP link, the PPP (TE) and PPP (MT) may send out and receive link configuration protocol (LCP) packets to determine the standards of the ensuing data transmission. The LCP protocol packet may be used to check the identity of the linked device, accept or reject the peer device, determine the acceptable packet size for transmission, search for errors in configuration, and terminate the link if requirements exceed the parameters. The LCP may invoke an authentication protocol when PPP is configured to use authentication. The authentication protocol may be, for example, the password authentication protocol (PAP) or the challenge handshake authentication protocol (CHAP).

The link 32 may be established prior to or after an IP subnet request is received. For example, a PPP link may be established prior to receiving an IP subnet request and remain in a link-open phase until the IP subnet request is received. In another example, a PPP link is established upon receiving the IP subnet request. In another example, the link 32 is established upon receiving an instruction to establish a link.

After an LCP link has been established (opened), the PPP invokes one or more Network Control Protocols (NCPs) for the particular network layer protocol being carried on the link. The NCPs may include the Internet Protocol Control Protocol (IPCP), the Internetworking Packet Exchange Control Protocol (IPXCP), and NetBIOS Frames Control Protocol (NBFCP), IP Version 6 Control Protocol (IPv6CP), or any other now known or later developed network layer protocol. The Network Control Protocol (NCP) is provided in order to encapsulate and negotiate options for the multiple network layer protocols.

Figure 5A:
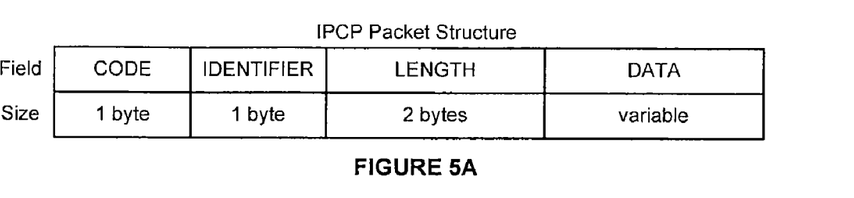
FIGS. 5A, 5B, and 5C illustrate one embodiment of IP subnet signaling.

An NCP packet may be transmitted between the PPP (TE) and PPP (MT). An NCP packet includes fields containing standardized codes to indicate the network layer protocol type that PPP encapsulates. For example, as shown in FIG. 5A, an IPCP packet structure may include a Code field, an Identifier field, a Length field, and a Data field. The Code field includes a decimal value that indicates the type of IPCP packet. The Identifier field includes a decimal value that aids in matching requests and replies. The Length field includes the length of the IPCP packet, including the Code, Identifier, Length, and Data fields. The Data field is a variable length field that may include one or more configuration options.

Figure 5B:
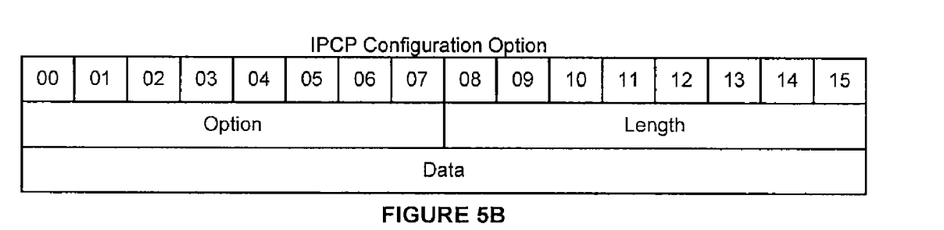

The format of an IPCP configuration option is shown in FIG. 5B. An IPCP configuration option includes an Option Type field, an Option Length field, and an Option Data field. The Option Type field may be a one-byte indication of the type of the configuration option. The Option Length field may include the length of the configuration option, including the Option Type, Option Length, and Option Data fields. The Data field includes the value of the Data field. One or more configuration options may be included the Data field.

Figure 5C:
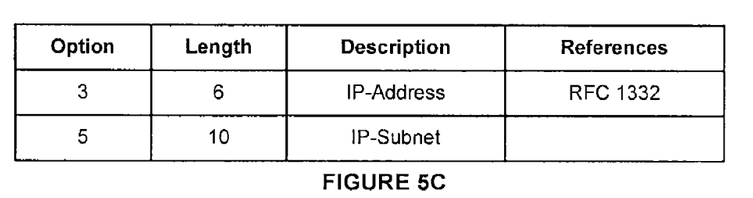

The PPP (TE) may incorporate the IP subnet request in the NCP packet. The IP subnet request may be included, for example, as a configuration option. The configuration option may describe the request and/or define the size of the IP subnet. In the example shown in FIG. 5C, if a single IP address is being requested, option 3, which requests a single IP address, may be used as a configuration option. However, if an IP subnet is requested, option "5" may be incorporated into the Option Type, length "10" may be incorporated into the Option Length, and the "IP-Subnet" description may be incorporated into the Option Data. The IP subnet configuration option may be used to request an IP subnet.

The PPP (MT) receives the NCP packet with the IP subnet request and initiates transmission of a radio request, which includes a request for an IP subnet. Initiating transmission of a radio request may include relaying the NCP packet with the IP subnet request and/or IP subnet request information to the radio 33.

The radio 33 may be a general packet radio, Universal Mobile Telecommunication System (UMTS) radio, or other radio for broadcasting an IP subnet request. The radio 33 may use wireless, radio signals to transmit an IP subnet request to the service provider network 40. For example, the radio 33 may be a general packet radio that generates and transmits messages that include a request for an IP subnet. In another example, the radio 33 is a UMTS radio that transmits a packet to one or more radio network controllers (RNCs) in the service provider network 40.

The general packet radio service (GPRS) is a packet oriented Mobile Data Service available to users of Global System for Mobile Communications (GSM) and IS-136 mobile phones. GPRS can be used for services such as Wireless Application Protocol (WAP) access, Short Message Service (SMS), Multimedia Messaging Service (MMS), and for Internet communication services such as email and World Wide Web access.

The radio 33 may transmit a packet data protocol (PDP) context activation request to the service provider network 40. The PDP context activation request may include a request for an IP subnet. For example, an information element may be added as a protocol configuration option in the PDP context activation request. The information element may be added to a radio signal that is transmitted from the radio 33 to the service provider network 40. The information element may include a request for an IP subnet.

Figure 6A:
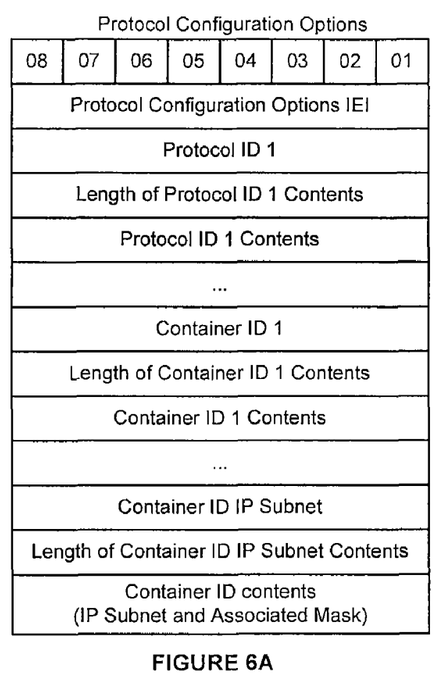
FIGS. 6A and 6B illustrate IP subnet signaling using information elements and a protocol configuration option.
Figure 6B:
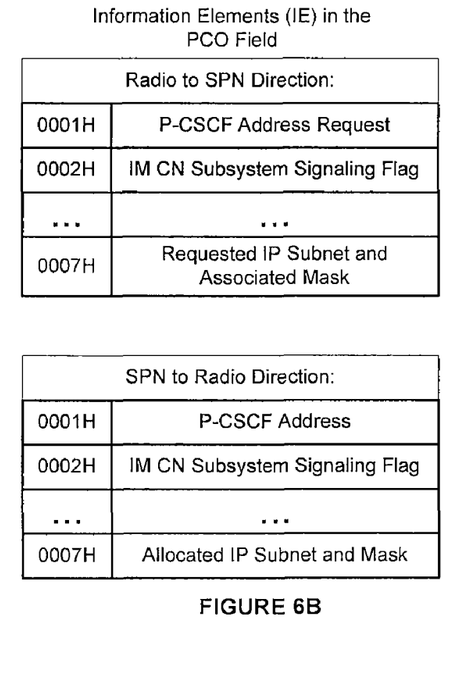

As shown in FIG. 6A, the information element may be included in the protocol configurations options (PCO) field. For example, Protocol ID 1 may be protocol ID 0007H, as shown in FIG. 6B. The protocol ID 0007H may describe a request for an IP subnet, an associated mask, and/or other information related to the IP subnet.

The cellular router 30 is operable to receive an IP subnet and/or associated mask from a service provider network 40. For example, the radio 33 receives the IP subnet and/or associated mask using wireless, radio signals. The cellular router 30 is operable to receive the IP subnet and/or associated mask in a container allocated for the IP subnet. For example, as shown in FIG. 6A, the Container ID IP Subnet may be protocol ID 0007H in the service provider network 40 to radio 30 direction. The Container ID IP Subnet may include an allocated IP subnet, an associated mask, and/or other information related to the IP subnet.

The radio 33 may transfer the IP subnet and/or associated mask to the server 31 using the link 32. For example, as shown in FIG. 4, the IP subnet and/or associated mask may be transmitted to the PPP (MT) as an IP subnet response. The IP subnet and/or associated mask may be transmitted across the link 32 using an NCP packet acknowledgment. For example, the IP subnet and/or associated mask may be transmitted in the IPCP configuration option, as discussed above. The PPP (TE) may transfer the IP subnet response (e.g., including the IP subnet, associated mask, or combination thereof) to the server 31 for distribution to the communication devices 20.

The server 31 is operable to distribute all, some, or none of the IP addresses in the IP subnet to one or more communication devices 20. Distribution may include assigning the communication device 20 an IP address, a lease (the length of time for which the allocation is valid), other IP configuration parameters, such as the subnet mask and the default gateway, any combination thereof, or any other now known or later developed IP subnet information. In the example above, as shown in FIG. 2, the processor 31 distributes IP Address AA to communication device A, IP Address BB to communication device BB, and IP Address CC to communication device CC.

The IP addresses may be requested, distributed, or the combination thereof at the same time or different times. For example, as shown in FIG. 2, Address Request B may occur prior to Address Response A. In another example, Address Response A and Address Response B may occur simultaneously or almost simultaneously. In another example, Address Response C may occur prior to Address Response A.

IP Subnet A request may occur prior to address request A/B/C depending on the cellular router configuration. It may be initiated on an incoming IP connection from outside to the communication device(s) and/or cellular router.

Figure 4B:
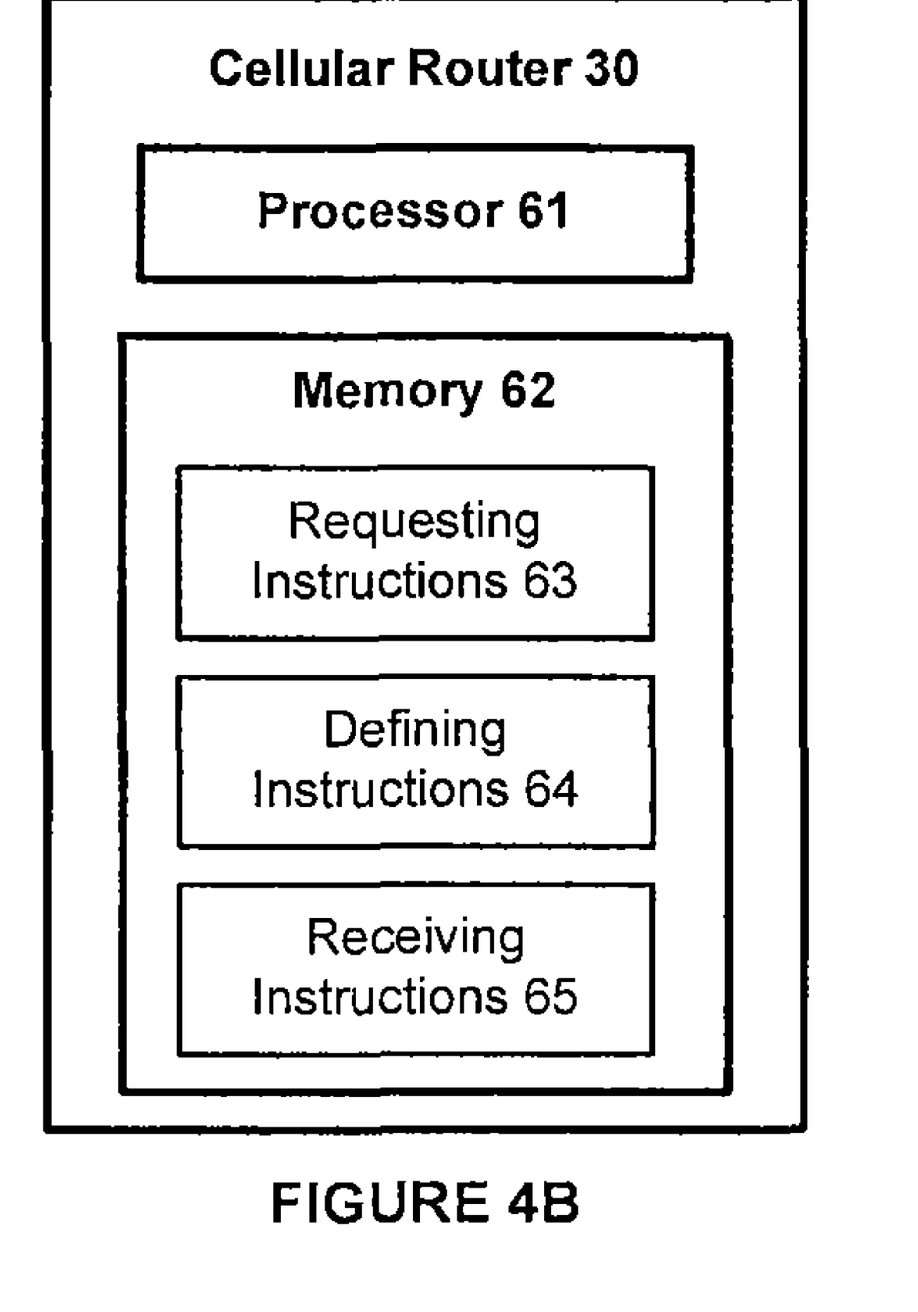

FIG. 4B shows another embodiment of a cellular router 30. In FIG. 4B, the cellular router 30 may include a processor 61 and memory 62. Additional, different, or fewer components may be provided.

The processor 61 is operable to execute logic stored in the memory 62. For example, the memory may include requesting instructions 63, defining instructions 64, receiving instructions 65, and distributing instructions. Additional, different, or fewer instructions may be provided.

The requesting instructions 63 may be executed to receive an IP address request, request an IP subnet, or the combination thereof. The IP subnet may include multiple publicly routable IP addresses. The requesting instructions 63 may transmit an IP subnet request to a network service provider. For example, the requesting instructions 63 may incorporate an IP subnet request in a radio signal that is transmitted to a network service provider.

The defining instructions 64 may define one or more parameters of the requested IP subnet. For example, the defining instructions 64 may be used to define the size of the IP subnet.

The receiving instructions 65 are executable to read an IP subnet in an IP subnet compartment, the IP subnet compartment carrying the multiple publicly routable IP addresses. The distributing instructions 66 are executable to distribute one of the multiple publicly routable IP addresses in the IP subnet when an IP request is received and stores the remaining IP addresses. Alternatively, the distributing instructions 66 are executable to distribute the multiple publicly routable IP addresses to one or more communication devices.

Figure 8:
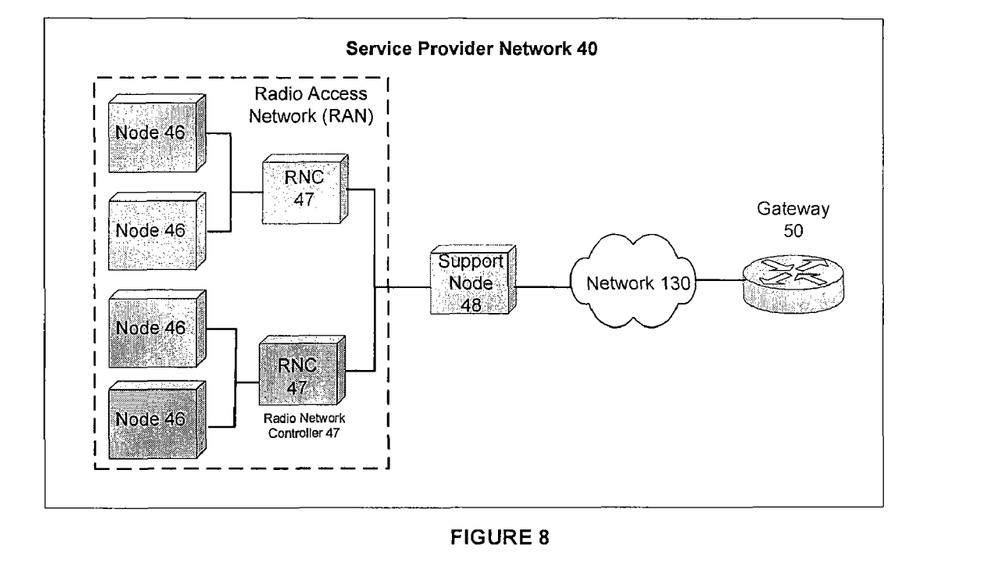
FIG. 8 illustrates one embodiment of a service provider network.

FIG. 8 shows a service provider network 40. The network service provider 40 may include a radio access network (RAN), a support node 48, and a gateway 50. Additional, different, or fewer components may be provided.

The network service provider 40 is a telecommunication service provider, data carrier service provider, wireless communications service provider, Internet service provider, cable television service provider, and other service providers offering Internet access. For example, the network service provider 40 may be an Internet service provider that allocates one or more IP addresses for cellular router 30.

The radio access network (RAN) may include one or more nodes 46 and one or more radio network controllers 47. Additional, different, or fewer components may be provided.

The RAN may be a network for receiving communication from the cellular router 30. For example, as shown in FIG. 8, the node 46 may be a wireless receiver, such as a radio tower or masts, that receives radio signals from the radio 33. The radio signals may include the IP subnet request. The node 46 may transmit the radio signals to a radio network controller (RNC) 47. The RNC 47 may relay the signal to the support node 48.

The support node 48 may be a serving GPRS support node (SGSN). The support node 48 is operable to deliver data packets from and to the mobile stations within its geographical service area. The support node 48 is operable for packet routing and transfer, mobility management (attach/detach and location management), logical link management, and authentication and charging functions. The location register of the SGSN stores location information (e.g., current cell, current visitor location register (VLR)) and user profiles (e.g., International Mobile Subscriber Identity (IMSI), address(es) used in the packet data network) of all GPRS users registered with this SGSN. The GPRS users registered with the support node 48 may include the cellular routers 30 or communication devices 20. The cellular routers 30 and/or communication devices 20 may register with the support node 48.

The support node 48 is operable to create a PDP context request for the gateway 50. The PDP context request may include information elements that request an IP subnet. The support node 48 is operable to transmit the PDP context request to the gateway 50. The PDP context request may be transmitted across network 130. The network 130 may interconnect the support node 48 and the gateway 50. The support node 48 may transmit the PDP context request across the network 130 using the Internet Protocol (IP).

Figure 7:
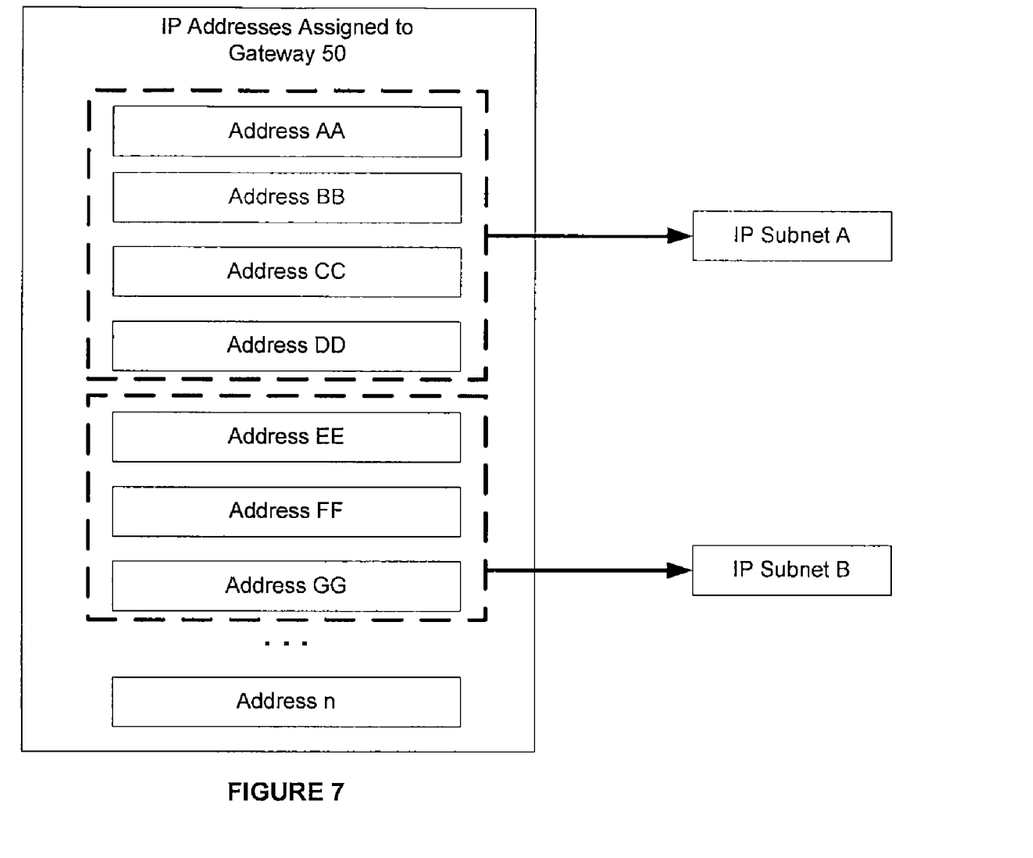
FIG. 7 illustrates one embodiment of an IP subnet.

The gateway 30 may be a gateway GPRS support node (GGSN) that acts as a gateway between a GPRS wireless data network and other networks such as the Internet or private networks. For example, the gateway 50 may be an interface between the GPRS backbone network and the external packet data networks (radio network and the IP network). The gateway 50 is operable to convert the GPRS packets coming from the support node 48 into the appropriate packet data protocol (PDP) format (e.g., IP or X.25) and sends them out on the corresponding packet data network. In the other direction, PDP addresses of incoming data packets are converted to the GSM address of the destination user. The readdressed packets are sent to the responsible support node 48. For this purpose, the gateway 50 stores the current support node 48 address of the user and his or her profile in its location register. The gateway 50 may be the default router for the connected UE (User Equipment). The gateway 50 may perform authentication and charging functions The gateway 50 may allocate an IP subnet for the cellular router 30. Allocation may include IP address assignment. For example, the gateway 30 may reserve one or more IP addresses for the cellular router. As shown in FIG. 7, the IP Subnet A, which includes Addresses AA-DD, may be reserved for a first cellular router, such as the cellular router illustrated in FIG. 2. The IP Subnet B, which includes Addresses EE-GG, may be reserved for a second cellular router.

Once an IP subnet is allocated to a cellular router 30, the gateway 50 does not re-allocate the IP addresses in the IP subnet to other cellular routers. For example, the IP addresses in the IP subnet are saved for the assigned cellular router. One benefit of saving the IP addresses is that the cellular router may store the addresses for responding to future IP address requests. The cellular router does not need to check whether the IP addresses have been used or re-allocated.

The gateway 50 may allocate the IP subnet as requested by the cellular router 30. For example, the cellular router 30 may request an IP subnet of a certain size, for example, with a defined number of addresses in the IP subnet. The gateway 50 may allocate the IP subnet based on the requested size. In another example, the cellular router 30 may allocate the IP subnet based on cost. The Gateway 50 may allocate IP subnet based on service agreements between the ISP and the Customer owning the cellular router.

The gateway 50 may return the IP subnet to the cellular router 30. Returning the IP subnet may include copying the IP subnet and associated mask into an ID container of the PDP context accept message. As shown in FIG. 6A, the IP subnet may be returned to the cellular router 30 in a Container ID for the IP subnet. For example, the Container ID "0007H" may be incorporated into the Container ID IP Subnet and the IP subnet and Associated Masks may be incorporated into the Container ID contents field. The length of the IP subnet and Associated Masks may be incorporated into the Length of Container ID field.

Figure 9:
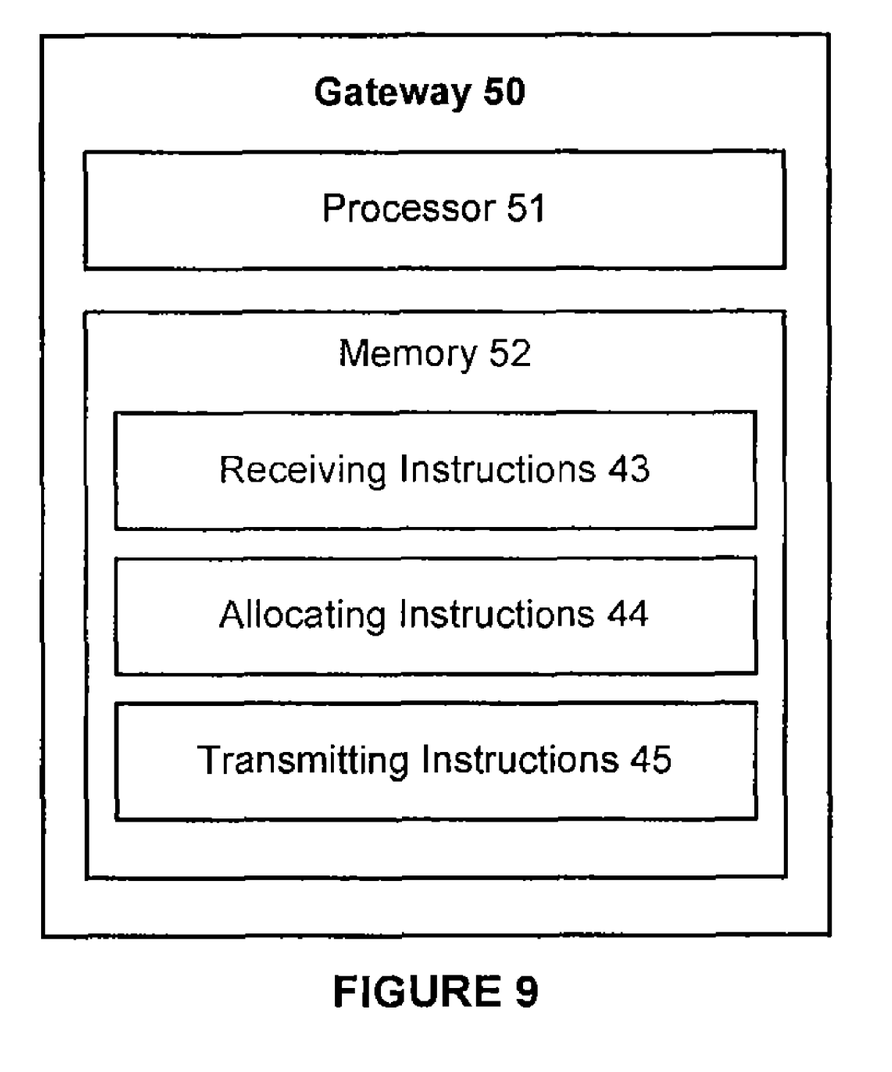
FIG. 9 illustrates one embodiment of a gateway.

FIG. 9 shows an exemplary gateway 50. The gateway 50 may include a processor 51 and memory 52. Additional, different, or fewer components may be provided.

The memory 52 may include data representing instructions, such as receiving instructions 43, allocating instructions 44, and transmitting instructions 45. Additional, different, or fewer instructions may be provided. For example, the memory 52 may not include the receiving instructions 43.

The processor 51 may execute the instructions. For example, the receiving instructions 43 may be executed to receive a request for an IP subnet. The request may be received from a cellular router or support node. The request may be a request for a specifically defined IP subnet or a generic request for an IP subnet. In another example, the allocating instructions 44 may be executed to allocate an IP subnet to a cellular router. The allocating instructions 44 may assign/reserve a number of IP addresses to the cellular router. In another example, the transmitting instructions 45 may be executed to transmit the IP subnet to the cellular router. The transmitting instructions 45 may be executed to transmit a list of the IP addresses in the IP subnet to the cellular router. The list of the IP addresses may be transmitted in a container for the IP subnet.

The processors 21, 51, 61 are general processors, digital signal processors, application specific integrated circuits, field programmable gate arrays, analog circuits, digital circuits, combinations thereof, or other now known or later developed processors. The processors 21, 51, 61 may be single devices or a combination of devices, such as associated with a network or distributed processing. Any of various processing strategies may be used, such as multi-processing, multi-tasking, parallel processing, or the like. Processing may be local, as opposed to remotely. For example, the processor 21 is operable to perform processing completed by the processor 31. The processors 21, 51, 61 are responsive to instructions stored as part of software, hardware, integrated circuits, firmware, micro-code or the like. The processors 21, 51, 61 are operable to perform one or more of the acts described above. For example, the processor 61 is operable to perform the acts of the server 31, link 32, radio 33, or a combination thereof.

The memory 22, 52, 62 is a computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 22, 52, 62 may be a single device or a combination of devices. The memory 22, 52, 62 may be adjacent to, part of, networked with and/or remote from the processor 21, 51, 61.

The memory 22, 52, 62 may be a computer readable storage media having stored therein data representing instructions executable by the programmed processor 21, 51, 61 for negotiating an IP subnet. The memory 22, 52, 62 may store instructions for the processors 21, 51, 61. The processors 21, 51, 61 are programmed with and execute the instructions. The functions, acts, methods or tasks illustrated in the figures or described herein are performed by the programmed processors 21, 51, 61 executing instructions stored in the memory 22, 52, 62. The functions, acts, methods or tasks are independent of the particular type of instructions set, storage media, processor or processing strategy and may be performed by software, hardware, integrated circuits, firm ware, microcode and the like, operating alone or in combination. The instructions are for implementing the processes, techniques, methods, or acts described herein.

Figure 10:
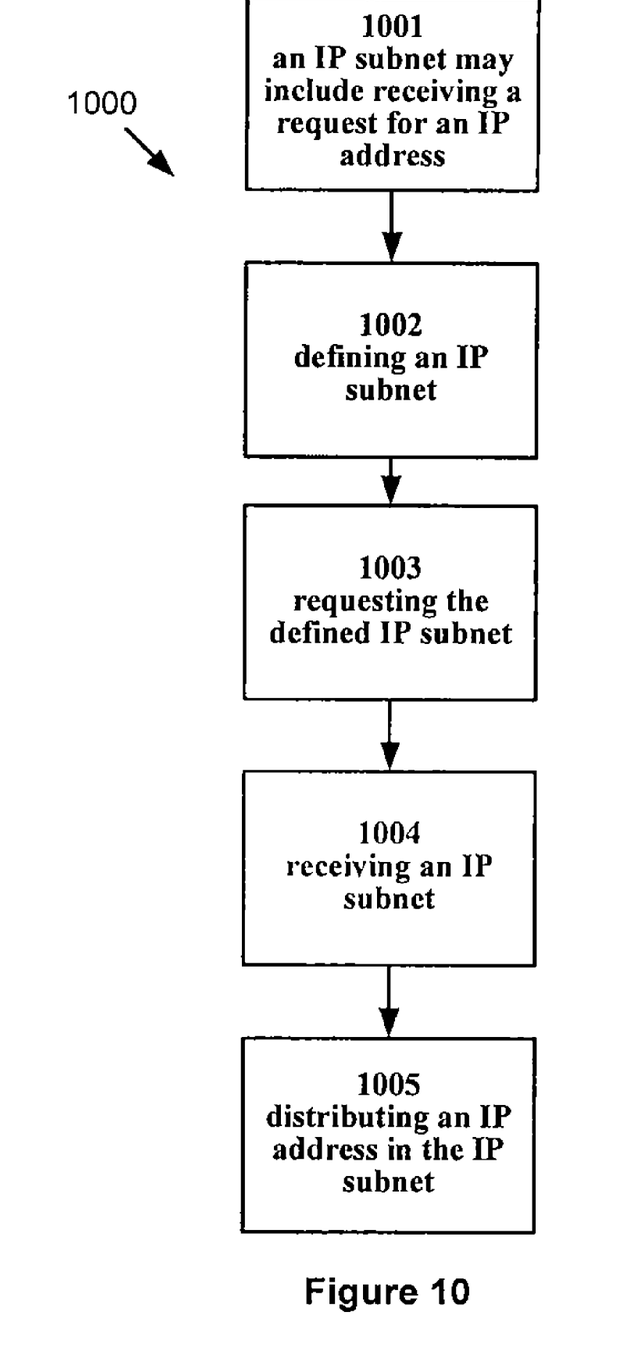
FIG. 10 illustrates one embodiment of a method for negotiating an IP subnet.

FIG. 10 shows one embodiment of a method 1000 for negotiating an IP subnet. The method is implemented using the system 100 of FIG. 1 or a different system. The acts may be performed in the order shown or a different order. The acts may be performed automatically, manually, or the combination thereof.

The method 1000 for negotiating an IP subnet may include receiving a request for an IP address 1001; defining an IP subnet 1002; requesting the defined IP subnet 1003; receiving an IP subnet 1004; and distributing an IP address in the IP subnet 1005. Additional, different, or fewer acts may be provided. For example, the method 1000 may include storing an IP subnet.

In act 1001, an IP address request is received. Receiving an IP address request may include transmitting an IP address request, identifying a need for an IP address, receiving the IP address request, or any combination thereof. For example, a communication device may request an IP address from a cellular router. The cellular router may receive the IP address request. As an example, a first communication device may transmit an IP address request to a cellular router. In another example, the cellular router may identify that a communication device will need an IP address to communicate with a central site. As an example, the cellular router may identify that the first communication device will need an IP address.

In act 1002, an IP subnet is defined. Defining an IP subnet may include determining the number of IP addresses needed to support the communication devices communicating with a cellular router. Different parameters of the IP subnet may be defined. For example, the size of the IP subnet may be defined, the maximum price of the IP subnet may be defined, the length of the leases in the IP subnet may be defined, or any combination thereof. Defining the size of the IP subnet may include defining the number of IP addresses to be included in the IP subnet. Defining the maximum price of the IP subnet may include defining the amount of money to be spent on IP addresses. As an example, the IP subnet request may be defined based on the number of communication devices that are registered to communicate with the cellular router.

In act 1003, the defined IP subnet is requested. Requesting the IP subnet may include transmitting the IP subnet request and receiving an IP subnet. Additional, different, or fewer acts may be provided.

Transmitting an IP subnet request may include incorporating configuration options in messages that request an IP subnet. Incorporating configuration options may include using IP subnet standards, protocols, or information elements. The configuration options may define the IP subnet. For example, an IP subnet information element may be added to an over-the-air signal. The IP subnet information element may define parameters of the IP subnet, which were defined in act 1002.

Receiving an IP subnet may include receiving a list of publicly routable IP addresses that are allocated to a cellular router. For example, the IP subnet may be in accordance with the parameters defined in act 1002. The IP subnet may be received in an IP subnet compartment. The IP subnet may be read and the IP addresses in the IP subnet identified.

In act 1005, an IP address in the IP subnet is distributed. One or more IP addresses in the IP subnet may be distributed to one or more communication devices. Distributing IP addresses may include assigning and communicating the IP addresses. Once an IP address is communicated to a communication device, the communication device may use the IP address to communicate with other devices across the IP network.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A system, comprising:
   a communication link that is configured to receive a request for a routable Internet Protocol (IP) address, the routable IP address being used to provide communication to a requesting communication device; and
   a cellular router in communication with the communication link, the cellular router comprising a server and a radio, the server of the cellular router configured to receive the request for the routable IP address, wherein the server comprises a processor and a memory,
   wherein the cellular router is further configured to incorporate a first request for an IP subnet in a Network Control Protocol (NCP) packet at the server,
   wherein the NCP packet includes configuration data comprising an option field configured with an option representative of the IP subnet, the configuration data further comprising a requested number of a plurality of routable IP addresses,
   wherein the NCP packet further includes a field that indicates a network layer protocol type encapsulated by a Point-to-Point Protocol (PPP) link, the PPP link between the server and the radio,
   wherein the cellular router is further configured to transmit a second request for the IP subnet in a packet data protocol (PDP) context activation request from the radio to a network service provider in a radio signal, and
   wherein the cellular router is configured to receive the IP subnet from the network service provider based on the option and is configured to provide the plurality of routable IP addresses to a plurality of communication devices including the requesting communication device over the communication link.

2. The system of claim 1, wherein the IP subnet includes a first IP address and a second IP address, the cellular router being operable to transmit the first IP address to the requesting communication device as an answer to the request for the routable IP address.

3. The system of claim 1, wherein the cellular router is operable to determine a size of the IP subnet as a function of a number of the plurality of communication devices registered with the cellular router, and the requested number of the routable IP addresses in the configuration data is the number of the plurality of communication devices registered with the cellular router.

4. The system of claim 3, wherein the size of the IP subnet is a number of IP addresses in the IP subnet that is received from the network service provider.

5. The system of claim 1, wherein the plurality of communication devices comprises a plurality of dedicated digital signage devices configured to display messages.

6. The system of claim 1, wherein the cellular router is configured to send the configuration data to the network service provider over a cellular call.

7. The system of claim 1, wherein the radio of the cellular router is configured to send the configuration data to the network service provider using general packet radio service (GPRS) or global system for mobile communications (GSM).

8. A method, comprising:
receiving, at a server of a cellular router, a request for an internet protocol (IP) address from a first communication device;
detecting a number of a plurality of communication devices in communication with the server of the cellular router, wherein the plurality of communication devices includes the first communication device;
incorporating a first request for an IP subnet in a Network Control Protocol (NCP) packet at the server of the cellular router;
including, at the server of the cellular router, configuration data in the NCP packet, the configuration data including an option representing the IP subnet to be received from a network service provider, and the configuration data further including a size of the IP subnet, the size based on the number of the plurality of communication devices in communication with the server of the cellular router;
including, at the server of the cellular router, a field in the NCP packet that indicates a network layer protocol type encapsulated by a Point-to-Point Protocol (PPP) link that is between the server of the cellular router and a radio of the cellular router;
transmitting a second request for the IP subnet in a packet data protocol (PDP) context activation request from the radio of the cellular router to the network service provider via a radio signal, the second request for the IP subnet comprising the size of the IP subnet that is based on the number of the plurality of communication devices in communication with the cellular router;
receiving the IP subnet at the cellular router from the network service provider based on the second request for the IP subnet having the size of the IP subnet that is based on the number of the plurality of communication devices in communication with the server of the cellular router, the IP subnet having a plurality of routable IP addresses based on the option representing the IP subnet, wherein the IP subnet includes a first IP address and a second IP address;
distributing the first IP address to the first communication device with the server of the cellular router; and
distributing the second IP address to a second communication device with the server of the cellular router.

9. The method of claim 8, wherein the first communication device is a first digital signage device and the second communication device is a second digital signage device.

10. A non-transitory computer readable storage medium including instructions that when executed are operable to:
receive an internet protocol (IP) address request at a server of a cellular router from a first communication device,
generate configuration data in a Network Control Protocol (NCP) packet, wherein the configuration data includes an option field configured to distinguish between a single IP address and an IP subnet of variable size, the IP subnet including a plurality of publicly routable IP addresses, wherein the NCP packet further includes a field that indicates a network layer protocol type encapsulated by a Point-to-Point Protocol (PPP) link, and wherein the PPP link is between the server and a radio of the cellular router;
transmit the NCP packet from the server to the radio over the PPP link as a first request for the IP subnet, wherein the radio transmits a second request for the IP subnet in a packet data protocol (PDP) context activation request to a network service provider in a radio signal;
receive, from the network service provider, the IP subnet, based on the option field in the configuration data in the NCP packet,
assign, at the server, a first routable IP address of the plurality of publicly routable IP addresses included in the IP subnet to the first communication device, such that communication sent to the first routable IP address is provided to the first communication device, and
assign, at the server, a second routable IP address of the plurality of publicly routable IP address included in the IP subnet to a second communication device without receipt at the server of an IP address request from the second communication device.

11. The non-transitory computer readable storage medium of claim 10, further including instructions that when executed are operable to dynamically define a number of the plurality of publicly routable IP addresses in the IP subnet.

12. The non-transitory computer readable storage medium of claim 11, further including instructions that when executed are operable to read the IP subnet from an IP subnet compartment, the IP subnet compartment carrying the plurality of publicly routable IP addresses.

13. The non-transitory computer readable storage medium of claim 11, further including instructions that when executed are operable to distribute a third routable IP address of the plurality of publicly routable IP addresses in the IP subnet when a second IP request is received.

14. The non-transitory computer readable storage medium of claim 11, further including instructions that when executed are operable to distribute the plurality of publicly routable IP addresses to the plurality of the communication devices.

15. The non-transitory computer readable storage medium of claim 10, wherein the configuration data is incorporated into the PDP context activation request that is transmitted in the radio signal.

16. The non-transitory computer readable storage medium of claim 10, wherein the first communication device is a first dedicated digital signage device and the second communication device is a second dedicated digital signage device.

* * * * *